United States Patent [19]
Wakita

[11] Patent Number: 5,422,747
[45] Date of Patent: Jun. 6, 1995

[54] LIQUID CRYSTAL DISPLAY PANEL HAVING WIDE AND BENT OUTERMOST ROW AND COLUMN ELECTRODES

[75] Inventor: Naohide Wakita, Osaka, Japan

[73] Assignee: Matsushita Electric Industrial Co., Ltd., Osaka, Japan

[21] Appl. No.: 24,312

[22] Filed: Mar. 1, 1993

[30] Foreign Application Priority Data

Mar. 2, 1992 [JP] Japan .................................. 4-44422

[51] Int. Cl.6 .......................................... G02F 1/1333
[52] U.S. Cl. ...................................... 359/54; 359/80; 359/82; 359/87
[58] Field of Search ................... 359/49, 54, 62, 82, 359/83, 87, 80

[56] References Cited

U.S. PATENT DOCUMENTS

| | | | |
|---|---|---|---|
| 4,412,214 | 10/1983 | Tanaka et al. | 359/88 |
| 4,515,440 | 5/1985 | Mosier | 359/88 |
| 4,789,858 | 12/1988 | Fergason et al. | 359/82 |
| 4,806,922 | 2/1989 | McLaughlin et al. | 359/82 |
| 5,106,197 | 4/1992 | Ohuchida et al. | 359/83 |

FOREIGN PATENT DOCUMENTS

| | | |
|---|---|---|
| 0165063 | 12/1985 | European Pat. Off. . |
| 60-247684 | 12/1985 | Japan . |
| 61-118789 | 6/1986 | Japan . |
| 61-204679 | 9/1986 | Japan . |
| 0027021 | 2/1991 | Japan .................. 359/82 |

Primary Examiner—William L. Sikes
Assistant Examiner—Tai V. Duong
Attorney, Agent, or Firm—Wenderoth, Lind & Ponack

[57] ABSTRACT

A display has a large-sized screen made up of a plurality of liquid crystal display panels, each of which comprises first and second substrates opposed to and spaced from each other. The two substrates have respective peripheral portions rearwardly bent along edges of a display region defined therebetween. A plurality of row electrodes are mounted on an inner surface of the first substrate and extend generally in parallel with one another, whereas a plurality of column electrodes are mounted on an inner surface of the second substrate so as to be opposed to the row electrodes. The column electrodes extend generally in parallel with one another in a direction generally perpendicular to the direction in which the row electrodes extend. The above display region is delimited by outer edges of outermost row and column electrodes.

1 Claim, 3 Drawing Sheets

LIQUID CRYSTAL DISPLAY PANEL HAVING WIDE AND BENT OUTERMOST ROW AND COLUMN ELECTRODES

BACKGROUND OF THE INVENTION

1. Field of the Invention

The present invention relates to a liquid crystal display panel and also to a display having a large screen made up of a plurality of liquid crystal display panels.

2. Description of the Prior Art

Conventionally, a large-sized display for public use is generally made up of incandescent lamps, LEDs, CRTs, LCDs or the like. As the case stands, each of such devices is of a limited size and has a limited display capacity, and a plurality of these devices are generally arrayed either horizontally or vertically or in both directions and are assembled into a large-sized display, thereby facilitating the manufacture or maintenance of the latter.

Because a liquid crystal display is a passive display, it has the advantage of being easy to view even under the environmental conditions in which it receives relatively strong external light, and also has the advantage of being inexpensive.

Japanese laid-open patent publication (unexamined) No. 60-247684 discloses a display having a large screen made up of a plurality of horizontally and vertically arrayed display panels. Each of the display panels comprises a pair of opposed glass or plastic substrates, two sets of opposed transparent electrodes formed on inner surfaces of the paired substrates, respectively, and a liquid crystal sandwiched between the substrates. The periphery of the display panel is hermetically sealed by a resin material, which also serves as a spacer. Because each of the transparent electrodes formed on the substrates has a terminal to be connected to an external driving circuit, the sealing material is printed several millimeters inwardly from edges of the substrates.

Because a display region is a liquid crystal area sandwiched between the opposed transparent electrodes, the sealing portion and the electrode terminals extend outwardly beyond the display region. The panel is generally assembled by bonding the two substrates to each other after the sealing material has been printed on one of the substrates. During bonding, the sealing resin is broadened to about 2 millimeters. For this reason or in anticipation of marginal areas during printing, the sealing portion extends about 4 millimeters outwardly from the display region on one side thereof. In further consideration of the length of the electrode terminals, the panel becomes, as a whole, image than the display region by 1 centimeter or more.

This panel is connected to a driving circuit on a printed-circuit board and is rigidified by a frame. In this way, the manufacture of a display is completed. Because a large-sized screen is generally made up of a plurality of vertically and horizontally arrayed display panels, adjoining panels are inevitably spaced a certain distance from each other, and hence, the problem arises that the screen, as a whole, cannot provide a continuous image and provides an image in broken style.

In the aforementioned publication, the spacing between two adjoining panels is narrowed by placing electrode terminals of one panel above those of the other. It is, however, practically impossible to obtain a spacing of zero.

Japanese laid-open patent publication (unexamined) No. 61-118789 discloses a lighting fixture having a trigonal prism interposed between a liquid crystal and a light source. In this publication, joints between adjoining panels are made inconspicuous by obliquely introducing light from the light source to the display region. In this case, although the joints are not so conspicuous, the prism is costly.

SUMMARY OF THE INVENTION

The present invention has been developed to overcome the above-described disadvantages.

It is accordingly an object of the present invention to provide an improved liquid crystal display panel wherein an area outside a display region thereof is minimized.

Another object of the present invention is to provide a display having a large-sized screen made up of a plurality of vertically and horizontally arrayed display panels of the above-described type, wherein joints between adjoining display panels are made inconspicuous to provide an almost continuous image without increasing the manufacturing cost of the display.

In accomplishing the above and other objects, a liquid crystal display panel according to the present invention comprises first and second substrates opposed to and spaced from each other and having respective peripheral portions rearwardly bent along edges of a display region defined between the first and second substrates. A plurality of row electrodes are mounted on an inner surface of the first substrate and extend generally in parallel with one another, whereas a plurality of column electrodes are mounted on an inner surface of the second substrate so as to be opposed to the row electrodes. The column electrodes extend generally in parallel with one another in a direction generally perpendicular to the direction in which the row electrodes extend. The aforementioned display region is delimited by outer edges of outermost row and column electrodes. A liquid crystal is interposed between the two substrates.

In another aspect of the present invention, a display is comprised of a plurality of regularly arrayed liquid crystal display panels of the above-described construction.

When adjoining liquid crystal display panels are arrayed either in contact with or in close proximity to each other at respective rearwardly bent peripheral portions, an image is displayed on a practically continuous large-sized screen. Because each of the liquid crystal display panels is generally comprised of a pair of plastic substrates each having a thickness of several tens of microns to about a hundred microns, these substrates are susceptible to bending. Accordingly, the spacing between adjoining display regions can be reduced to several hundreds microns at most by rearwardly bending sealing portions and terminals thereof. If the pitch of the row and column electrodes is chosen to be about 1 millimeter or more, the spacing between the electrodes and that between the display regions can be made substantially the same. As a result, the plurality of display regions can be viewed without any unnatural feeling as if an image displayed thereon is a continuous image.

BRIEF DESCRIPTION OF THE DRAWINGS

The above and other objects and features of the present invention will become more apparent from the following description of a preferred embodiment thereof with reference to the accompanying drawings, throughout which like parts are designated by like reference numerals, and wherein.

DETAILED DESCRIPTION OF THE PREFERRED EMBODIMENTS

Figure 1:
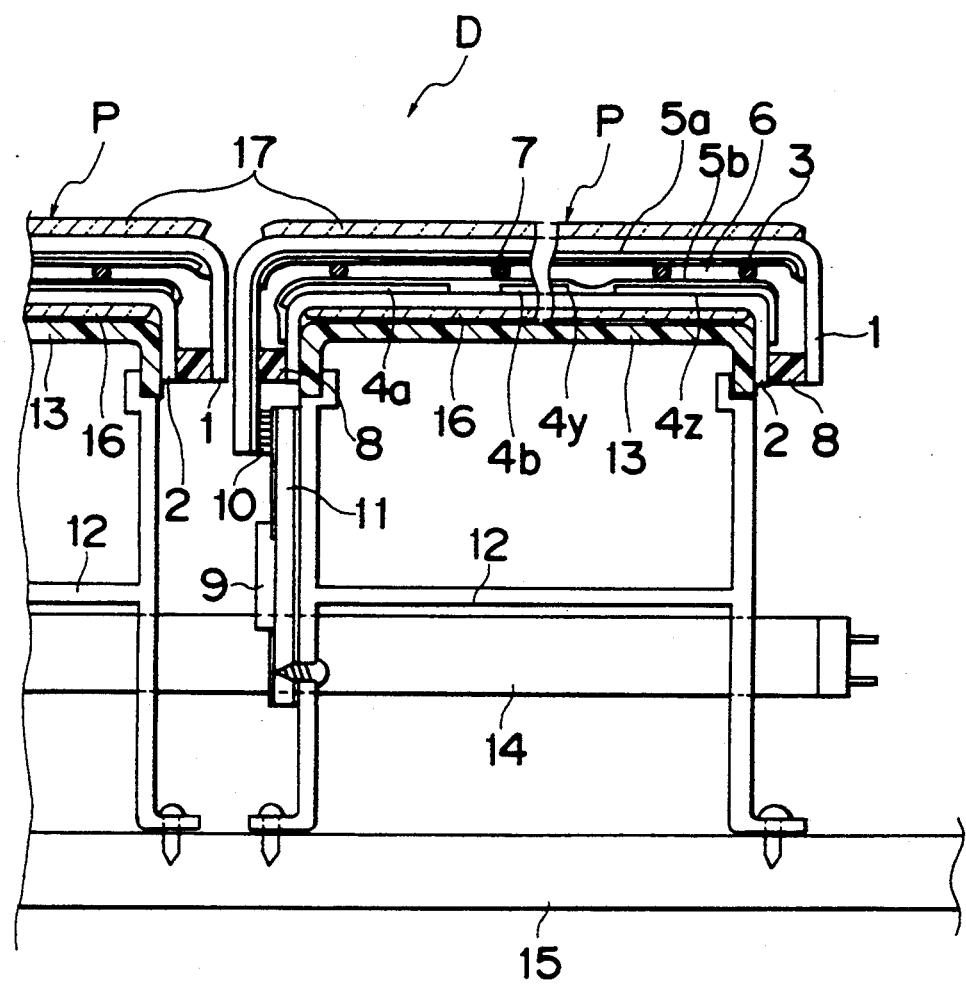
FIG. 1 is a fragmentary sectional view of a display comprised of a plurality of liquid crystal display panels according to the present invention.

Referring now to the drawings, there is shown in FIG. 1 a display D employing therein a plurality of liquid crystal display panels P according to the present invention.

It is initially to be noted that although each of the display panels P is illustrated as having rearwardly bent peripheral portions, it is initially in the form of a considerably thin rectangular parallelepiped at the beginning of its assembly process.

The display panel P comprises generally flat opposed upper and lower substrates 1 and 2 spaced a distance from each other, a plurality of row electrodes 3 mounted on the inner surface of the upper substrate 1 and extending generally in parallel with one another, and a plurality of column electrodes 4a–4z mounted on the inner surface of the lower substrate 2 and extending generally in parallel with one another in a direction perpendicular to the direction in which the row electrodes 3 extend. Each of the upper and lower substrates 1 and 2 is made of plastic such as, for example, polycarbonate and has a thickness of 50 microns, whereas each of the row and column electrodes 3 and 4a–4z is made of indium tin oxide. The row electrodes 3 are coated with a polyimide alignment layer 5a, whereas the column electrodes 4a–4z are coated with another polyimide alignment layer 5b. A rubbing treatment is carried out such that the direction of rubbing on the upper substrate 1 may be generally perpendicular to that of rubbing on the lower substrate 2. Thereafter, a large number of spherical spacers 7, each having a diameter of 8 microns, are appropriately scattered on one of the two substrates 1 and 2, and a UV curable sealant 8 is silk screened on the other substrate at a location spaced 5 millimeters outwardly from a display region thereof. Upon dripping a required amount of nematic liquid crystal 6 under vacuum, the two substrates 1 and 2 are bonded to each other. Then, the liquid crystal is hermetically sealed by the application of ultraviolet rays to a sealing portion. Thereafter, two polarizing plates 16 and 17 are laminated on outer surfaces of the display panel P, respectively.

Up to this stage, the two substrates 1 and 2 are maintained substantially flat, and hence, the liquid crystal display panel P takes the form of a considerably thin rectangular parallelepiped, as is the case with the conventional panel.

Figure 2:
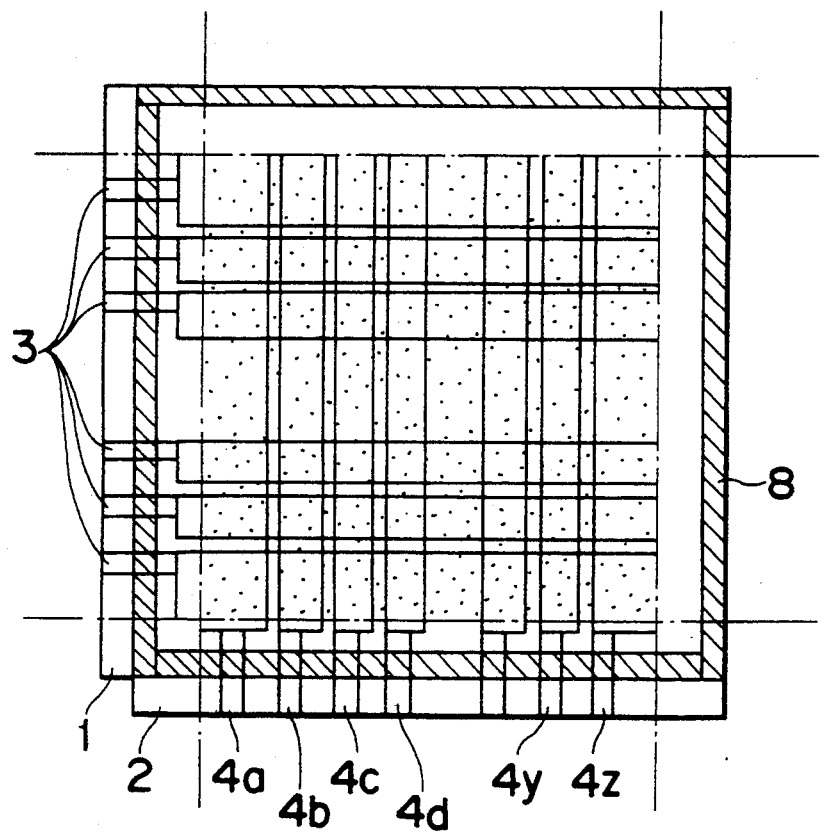
FIG. 2 is a top plan view of one of the liquid crystal display panels before bending.

FIG. 2 depicts the display panel P assembled in the above-described manner. This display panel P is then bonded, by the use of an adhesive, to a generally flat upper surface of a diffuser plate 13 having a generally U-shaped cross section such that outer edges of two outermost row electrodes 3 and those of two outermost column electrodes 4a and 4z are lined up with four sides of the upper surface of the diffuser plate 13, respectively. In FIG. 2, a dotted area, at which the row and column electrodes 3 and 4a–4z cross, is indicative of the display region, and the four sides of the upper surface of the diffuser plate 13 are lined up with single dotted chain lines, respectively, during bonding. The diffuser plate 13 not only diffuses light emitted from a fluorescent lamp 14 disposed at a location opposite to the display panel P, but also functions as a panel carrier for securely mounting thereon the display panel P.

As shown in FIG. 1, according to the present invention, the peripheral portions of the display panel P are bent rearwardly along peripheral portions of the diffuser plate 13. In this case, inwardly facing surfaces of the lower substrate 2 is also bonded to outwardly facing surfaces of the diffuser plate 13, but the bonding of the former to the latter is not necessarily required.

As best shown in FIG. 1, the row electrodes 3 are connected at respective terminals, via an anisotropic conductive rubber 10, to a circuit-board 11 on which a driving circuit 9 is mounted. Because terminals of the column electrodes 4a–4z are directed outwardly after the bending, the column electrodes 4a–4z are connected to the circuit-board 11 via a flexible substrate. The diffuser plate 13 and the circuit-board 11 are securely mounted on and assembled with a fixture 12 into one unit.

Thereafter, a plurality of display panels P are horizontally and vertically arrayed and anchored on a housing 15 such that adjoining display panels P may be either in contact with or in close proximity to each other. By doing so, the display region on one display panel P is spaced from that of another display panel P contiguous thereto only by a distance nearly equal to about two times the film thickness (about a hundred microns).

In this embodiment, the electrode width and the spacing between the electrodes were chosen to be 3 millimeters and 120 microns, respectively. When the adjoining panels were brought into contact with each other, an image could be viewed without any unnatural feeling as if the image was displayed on one large continuous screen. Even if the adjoining panels are slightly spaced a distance of about 0.1 millimeter from each other in anticipation of errors in bending the panels or the panel carriers, the spacing between the panels is a little over four times the film thickness which will cause little problem.

The radius of curvature of the bent portions of the panel was chosen to be 1 millimeter. Bending the electrodes more sharply sometimes resulted in cutting of the electrodes. Because of this, the outermost row and column electrodes 3, 4a and 4z were chosen to be 1.6 millimeters wider than any other row and column electrodes bonded to the generally flat upper surface of the diffuser plate 13. The bending was carried out so that all of the row and column electrodes 3 and 4a–4z had the same width as viewed from the front.

Figure 3:
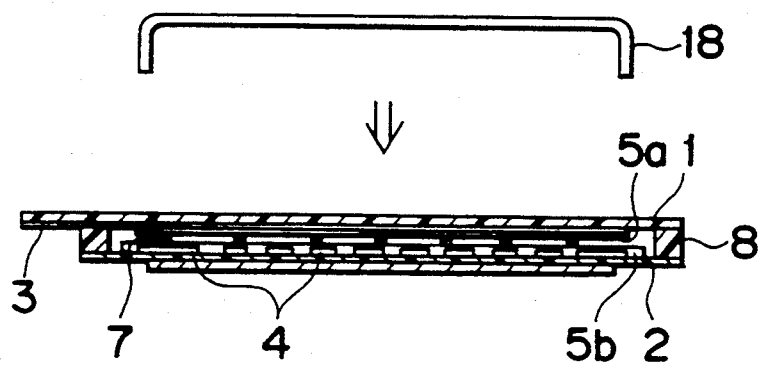
FIG. 3 is a sectional view of one of the liquid crystal display panels before a transparent support plate having rearwardly bent peripheral portions is pressed against it.

In this embodiment, although the bending was carried out after the display panel P was bonded to the diffuser plate 13 positioned rearwardly thereof, the bending may be carried out by pressing a transparent support plate 18 having rearwardly bent peripheral portions against the display panel P, as shown in FIG. 3. In this case, the display panel P is anchored on an inner surface of the support plate 18, and the rearwardly bent peripheral portions of the latter are connected to, for example, a frame of a display. In FIG. 1, although the diffuser plate 13 is illustrated as having the rearwardly bent peripheral portions, it may be replaced by a generally flat support plate. In this case, the diffuser plate 13 is generally positioned rearwardly of the support plate. Furthermore, the preferred bending angle is about 90°, because this bending angle is a minimum angle required to minimize the distance between the panels.

Furthermore, if the diffuser plate 13 is positioned at a location rearwardly of the display panel P, the support plate can be removed by making at least one of the plastic films of the liquid crystal panel P thicker. In this case, the bending can be carried out by the application of pressure and/or heat to the display panel P itself. Because the distance between adjoining display regions depends upon the thickness of the front film of the display panel P, it is preferred to make the thickness of the rear film thicker.

Figure 4:
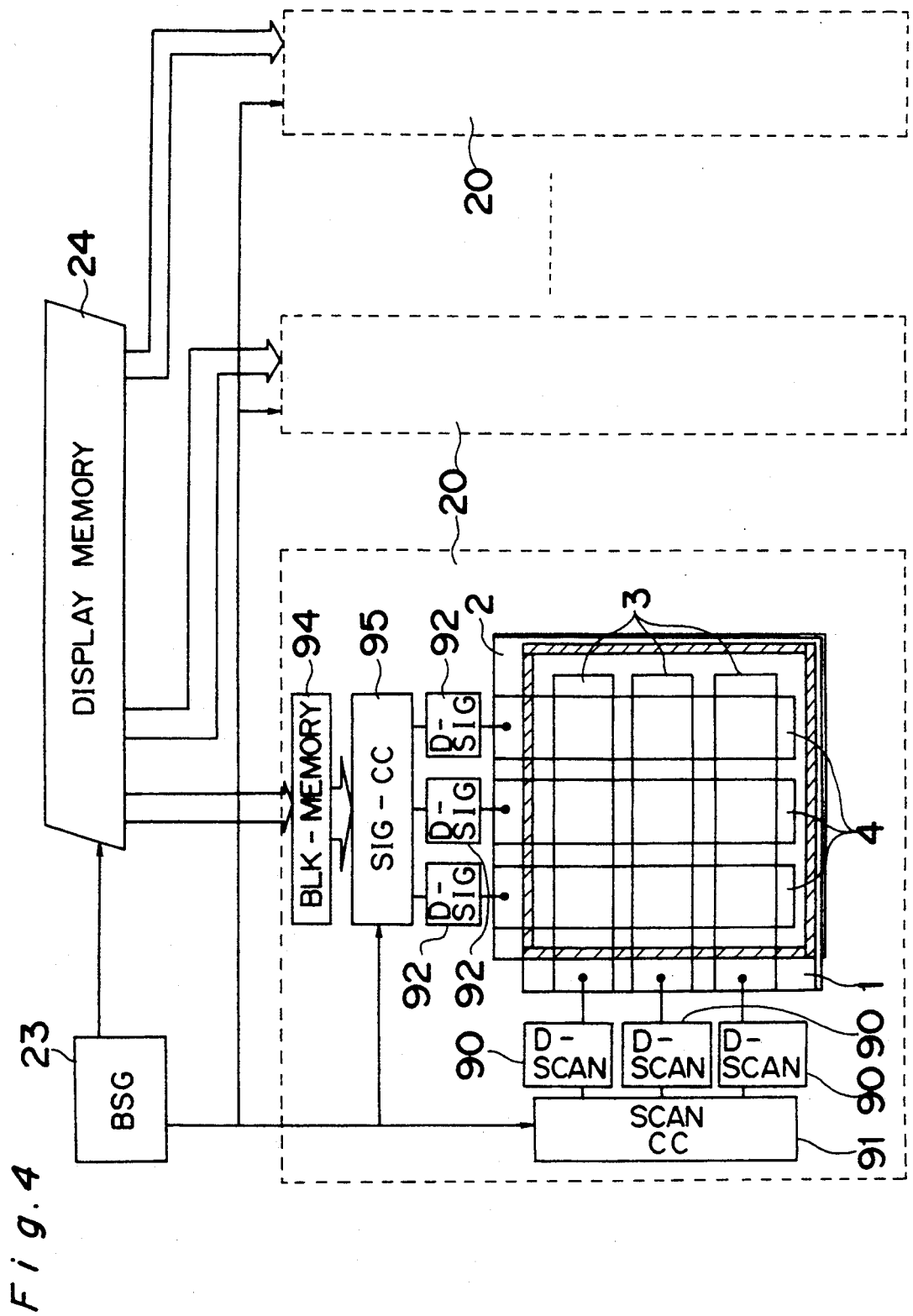
FIG. 4 is a block diagram of a driving circuit for driving each display unit.

FIG. 4 schematically depicts the driving circuit of the display D. Each of a plurality of display panel units 20 surrounded by a dotted line indicates the liquid crystal panel P and the driving circuit 9 mounted on the circuit-board 11 (the liquid crystal panel is, however, simplified as compared with that shown in FIG. 2 and is illustrated as having (3×3) pixels). The driving circuit 9 of each unit 20 is controlled by a base signal from a base signal generating circuit 23, and the memory contents corresponding to each unit 20 are introduced from a display memory 24 to a block memory 94 of the unit 20.

In each unit 20, the row electrodes 3 are connected to respective driver LSIs (D-scan) 90, whereas the column electrodes 4a-4z are connected to respective driver LSIs (D-sig) 92. The driver LSIs 90 are connected to a scanning signal control circuit 91, which sends scanning signals to the driver LSIs 90 to successively apply selection signals to the row electrodes 3. At this time, signal voltages associated with the contents of the block memory 94 corresponding to selected rows are applied from the driver LSIs 92 to the column electrodes 4a-4z via a signal voltage control circuit 95 in synchronism with the scanning signals by the operation of the base signal generating circuit 23. The signal waveform applied to the row and column electrodes 3 and 4a-4z complies with a voltage selection method generally available in a twisted nematic LCD. In this way, an image can be displayed on a large-sized screen made up of the display panels P of the plurality of units 20.

As is clear from the above, according to the present invention, because the peripheral portions of each display panel P having a pair of plastic films are rearwardly bent generally along the peripheral edges of the display region, the spacing between adjoining display regions can be considerably reduced, thereby making the four edges of each display panel P not so conspicuous. As a result, the plurality of display regions can be viewed as if an image displayed thereon has a practically continuous outline.

In the above-described embodiment, although explanation has been made with respect to a display D made up of a plurality of display panel units P, each of the display panel units P can be used alone. In this case also, an area outside the display region can be minimized.

Although the present invention has been fully described by way of example with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. A liquid crystal display panel comprising:
   first and second substrates opposed to and spaced from each other;
   a plurality of row electrodes mounted between said first and second substrates on an inner surface of said first substrate and extending generally in parallel with one another;
   a plurality of column electrodes mounted between said first and second substrates on an inner surface of said second substrate so as to be opposed to said row electrodes, said column electrodes extending generally in parallel with one another in a direction generally perpendicular to the direction in which said row electrodes extend, a display region being defined between said first and second substrates and being delimited by outer edges of outermost row electrodes of said plurality of row electrodes and by outer edges of outermost column electrodes of said plurality of column electrodes;
   a liquid crystal interposed between said first and second substrates;
   a resin seal, interposed between said first and second substrates at a location outside of said display region, for sealing said liquid crystal between said first and second substrates;
   wherein said first and second substrates have respective peripheral portions rearwardly bent along edges of said display region;
   wherein said outermost row and column electrodes are wider than any other of said row and column electrodes; and
   wherein said outermost row and column electrodes are also bent so that all of said row and column electrodes have equal widths on a plane parallel to said display region.

* * * * *